July 3, 1956      W. R. EAMES      2,752,853
ROTARY PUMP WITH FLOW CONTROL VALVES
Filed Dec. 14, 1951      9 Sheets-Sheet 1

INVENTOR.
WALTER R. EAMES

July 3, 1956  W. R. EAMES  2,752,853
ROTARY PUMP WITH FLOW CONTROL VALVES
Filed Dec. 14, 1951  9 Sheets-Sheet 2

INVENTOR.
WALTER R. EAMES
BY Hudson, Boughton,
Williams, David & Hoffmann
ATTORNEYS

INVENTOR.
WALTER R. EAMES

July 3, 1956  W. R. EAMES  2,752,853
ROTARY PUMP WITH FLOW CONTROL VALVES
Filed Dec. 14, 1951  9 Sheets-Sheet 4

INVENTOR.
WALTER R. EAMES
BY Hudson, Doughton,
Williams, David & Hoffmann.
ATTORNEYS July 3, 1956 W. R. EAMES 2,752,853
ROTARY PUMP WITH FLOW CONTROL VALVES
Filed Dec. 14, 1951 9 Sheets-Sheet 5

INVENTOR.
WALTER R. EAMES
BY
ATTORNEYS

July 3, 1956 W. R. EAMES 2,752,853
ROTARY PUMP WITH FLOW CONTROL VALVES
Filed Dec. 14, 1951 9 Sheets-Sheet 6

INVENTOR.
WALTER R. EAMES
BY Hudson, Boughton,
Williams, David & Hoffmann
ATTORNEYS July 3, 1956 W. R. EAMES 2,752,853
ROTARY PUMP WITH FLOW CONTROL VALVES
Filed Dec. 14, 1951 9 Sheets-Sheet 7

INVENTOR.
WALTER R. EAMES.
BY Hudson, Boughton,
Williams, David & Hoffmann
ATTORNEYS July 3, 1956 W. R. EAMES 2,752,853
ROTARY PUMP WITH FLOW CONTROL VALVES
Filed Dec. 14, 1951 9 Sheets-Sheet 8

INVENTOR.
WALTER R. EAMES
BY Hudson, Boughton,
Williams, David & Hoffmann
ATTORNEYS July 3, 1956  W. R. EAMES  2,752,853
ROTARY PUMP WITH FLOW CONTROL VALVES
Filed Dec. 14, 1951  9 Sheets-Sheet 9

INVENTOR.
WALTER R. EAMES
ATTORNEYS

United States Patent Office 2,752,853
Patented July 3, 1956

2,752,853

ROTARY PUMP WITH FLOW CONTROL VALVES

Walter R. Eames, Hazel Park, Mich., assignor to Eaton Manufacturing Company, Cleveland, Ohio, a corporation of Ohio Application December 14, 1951, Serial No. 261,655

22 Claims. (Cl. 103—42)

This invention relates to fluid pumps and, more particularly, to positive displacement pumps embodying novel flow control valve means. The invention is disclosed herein with reference to rotary pumps of the gear type, but is also applicable to other types of pumps.

Rotary pumps of the gear type are being used as a part of the auxiliary equipment of motor vehicles, as for example, for supplying fluid under pressure for actuating a hydraulic power steering device. When so used, the pump is usually driven from the vehicle power plant, and accordingly, is operated at widely varying rates of speed.

The rotary pump intended for this kind of service must be built of a size such that during its low speed operation it will be capable of delivering fluid at volume and pressure values suitable for the actuation of the steering device, or other auxiliary hydraulic device being supplied with the pumped fluid, and hence, when the pump is being driven at a relatively high speed its fluid delivery capacity may have volume and pressure values considerably in excess of the requirements of the auxiliary device being supplied.

The auxiliary device being supplied with fluid is usually contained in a closed-loop external hydraulic circuit through which the fluid is forced by the pump. When the excess fluid is forced through such a circuit at relatively high pressure and velocity values, it produces objectionable noises. The present invention is particularly concerned with the by-passing of such excess fluid from the discharge side to the intake side of the pump and, as its principal object, aims to provide a rotary pump having novel fluid control valve means by which the fluid being delivered will be automatically maintained at desired volume and pressure values and by which the excess fluid will by by-passed quietly and efficiently within the pump structure.

Another object of this invention is to provide a rotary pump of this character having novel fluid control valve mechanism comprising a volume control valve means and a pressure relief valve means.

A further object is to provide a rotary pump in which the fluid control means includes a permanently open flow control orifice through which the pumped fluid is delivered and valve means which is responsive to the pressure differential across the orifice.

Still another object is to provide a rotary pump of the character mentioned in which the valve mechanism of the control means comprises a volume control valve means and a pressure relief valve means and in which the permanently open flow control orifice is located in a movable valve member of one of such valve means.

As another object this invention provides a rotary pump in which the permanently open flow control orifice is located in the pump housing at a point adjacent to, but externally of the control valve mechanism.

It is likewise an object of this invention to provide a rotary pump in which the fluid being by-passed to the intake side of the pump by the pressure relief valve means is fluid which has already traversed the flow control orifice, that is to say, is fluid from the downstream side of the pump delivery passage being supplied through the orifice.

Yet another object is to provide a rotary pump in which the control valve mechanism is simple and compact and comprises a volume control valve means and a pressure relief valve means in a coaxially disposed relation, preferably with a pressure relief valve member movable in a hollow volume control valve member.

Additionally, this invention provides a rotary pump in which the control valve mechanism comprises a volume control valve device and a pressure relief valve device and in which the movable valve member of one or both of such valve devices is equipped with a dashpot means.

The invention can be further briefly summarized as consisting in certain novel combinations and arrangements of parts hereinafter described and particularly set out in the claims hereof.

In the accompanying sheets of drawings.

Before proceeding with the detailed description of the rotary pump 10 shown in Figs. 1 to 6 inclusive, it should be explained that this pump is here shown, by way of example, as forming a part of a pumping unit 11 of the kind intended to be used on motor vehicles in conjunction with the actuation of one or more hydraulic auxiliary devices such as a hydraulic power steering device. In addition to the pump 10, the pumping unit 11 comprises a reservoir 12 mounted directly on the pump and adapted to contain a quantity of oil or other suitable hydraulic fluid, and an external closed-loop fluid circuit 13. The external fluid circuit 13 contains the hydraulic device being actuated, such as the power steering device 14 which is here shown only diagrammatically, and fluid pressure delivery and return conduits 15 and 16 connecting the steering device 14 with the pump 10.

Figures 1, 4:
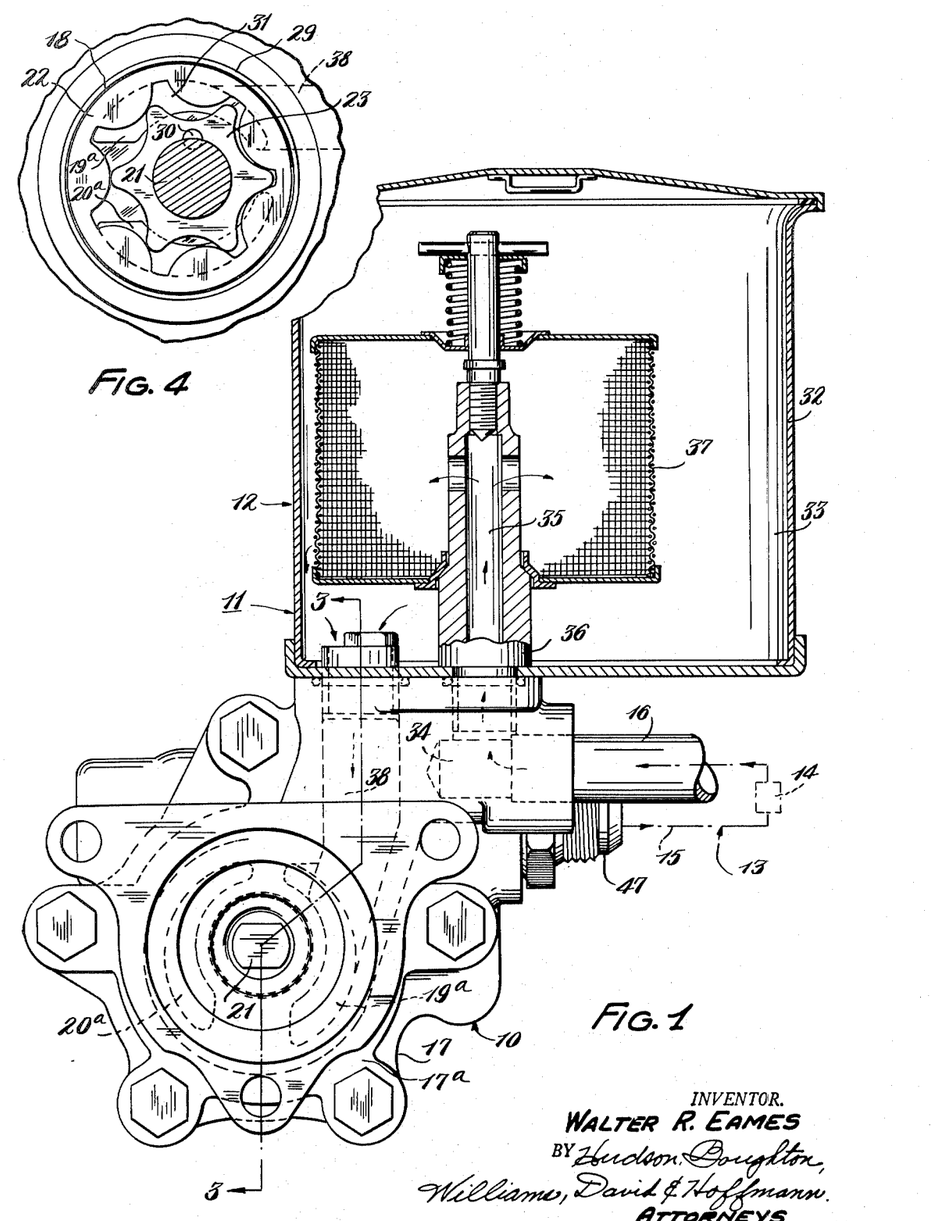
Fig. 1 is an end view showing the rotary pump of this invention embodied in a pumping unit and with the reservoir of the pumping unit shown in vertical section.
Fig. 4 is a partial vertical section taken through the pump on section line 4—4 of Fig. 3 and showing the cooperating toothed rotors.
Figure 2:
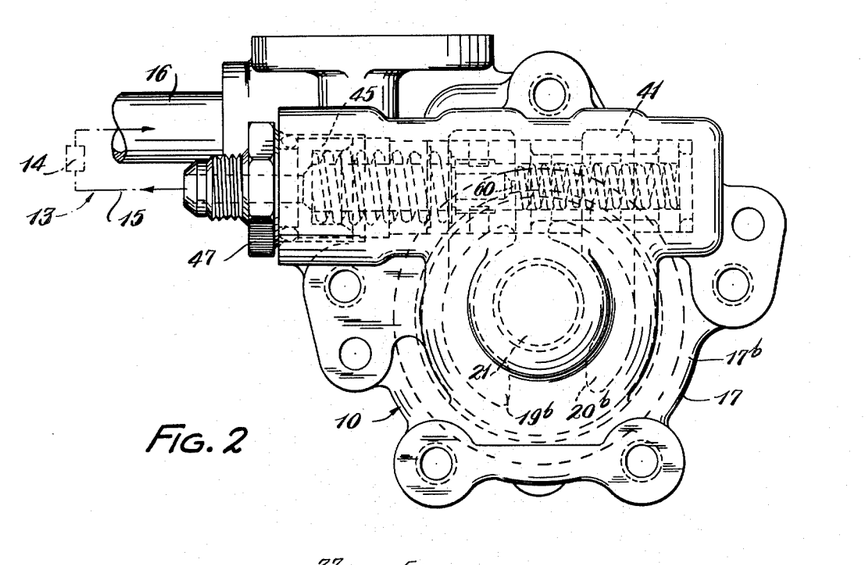
Fig. 2 is an end elevation of the pump as seen from the opposite end thereof.
Figure 3:
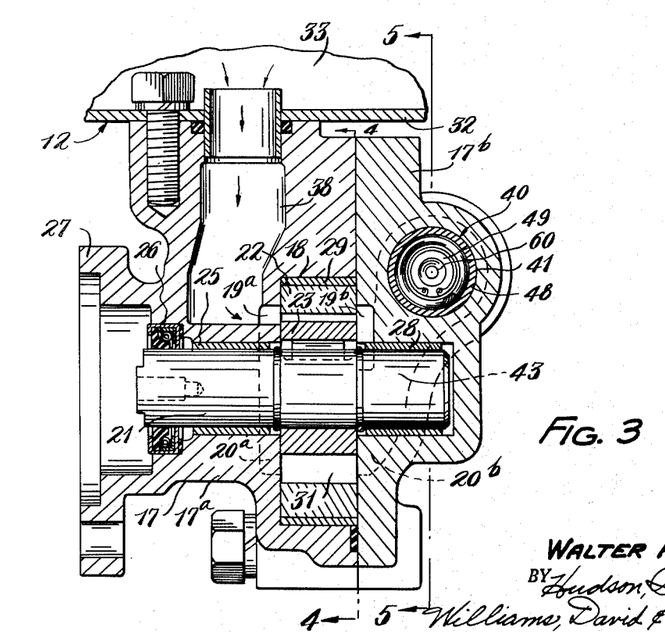
Fig. 3 is a partial vertical section taken through the pump on the irregular section line 3—3 of Fig. 1.

The pump 10 comprises a housing 17 which is here shown as being formed by a pair of connected housing members consisting of a body member 17a and a cover member 17b. The body member 17a has a substantially cylindrical working chamber or rotor chamber 18 therein, and also has a pair of arcuate intake and discharge ports 19a and 20a therein at one end of the rotor chamber. The cover member 17b forms a closure for the rotor chamber and has a pair of arcuate intake and discharge ports 19b and 20b formed therein at the other end of the rotor chamber.

The rotary pump 10 also includes pump means operable in the chamber 18 and which pump means is here shown as comprising a shaft 21 and a pair of cooperating toothed rotors 22 and 23 adapted to be driven by the shaft. The shaft 21 has its inner end rotatably supported in the body member 17a by a bushing 25 mounted in the latter. This end of the shaft projects through a sealing device 26 and is adapted for connection with some available rotatable part of the vehicle power plant from which the pump 10 is to be driven. The body member 17a is provided with a suitable mounting flange 27 by which the pump 10 is adapted to be secured to an available support. The opposite or outer end of the shaft 21 is rotatably supported in the cover member 17b by a bushing 28 mounted in the latter.

The outer rotor member 22 is an internal gear rotatably supported in the rotor chamber 18 by the annular bushing or liner 29. The inner rotor member 23 comprises a gear member mounted on the shaft 21 and connected therewith by means of the key 30. The outer and inner rotor members 22 and 23 have their toothed portions in meshing engagement and define variable pumping chambers 31 which communicate in succession with the intake and discharge ports 19a, 19b and 20a, 20b to produce the desired pumping action.

The reservoir 12 comprises a substantially cup-shaped structure 32 which is mounted directly on the body member 17a of the rotary pump 10 and defines a reservoir chamber 33. Fluid being returned to the pump 10 from the steering mechanism 14 through the conduit 16 flows into the reservoir chamber 33 through a passage 34 of the body member 17a and through the passage 35 of a fitting 36 which extends axially of the reservoir chamber. The fitting 36 supports a strainer 37 through which the returning fluid passes for the separation of foreign particles therefrom.

Fluid is supplied to the intake port 19a from the reservoir chamber 33 through a passage 38 formed in the body member 17a in depending relation to the reservoir chamber. The pumped fluid is delivered into the discharge port 20b by the pumping chambers 31 and is supplied to the conduit 15 of the external fluid circuit 13 under pressure through control valve mechanism 40 which will be presently described in detail.

In the operation of the pumping unit 11 above described, it is desirable that the rotary pump 10 supply fluid to the external fluid circuit 13 at a substantially constant rate and pressure at all times, regardless of widely varying rates of speeds at which the pump is driven by the vehicle engine. The capacity of the pump 10 must be such that the volume and pressure values of the fluid which is supplied to the external circuit 13 during a relatively low speed operation of the pump, will be adequate for the requirements of the steering mechanism 14, and accordingly, during a relatively high speed operation of the pump the quantity of pumped fluid will be substantially in excess of that required by the steering mechanism. The control valve mechanism 40 serves to by-pass the excess quantity of the pumped fluid from the discharge side of the pump to the intake side thereof and accomplishes this internally of the pump structure in a quiet and efficient manner.

Figures 5, 6:
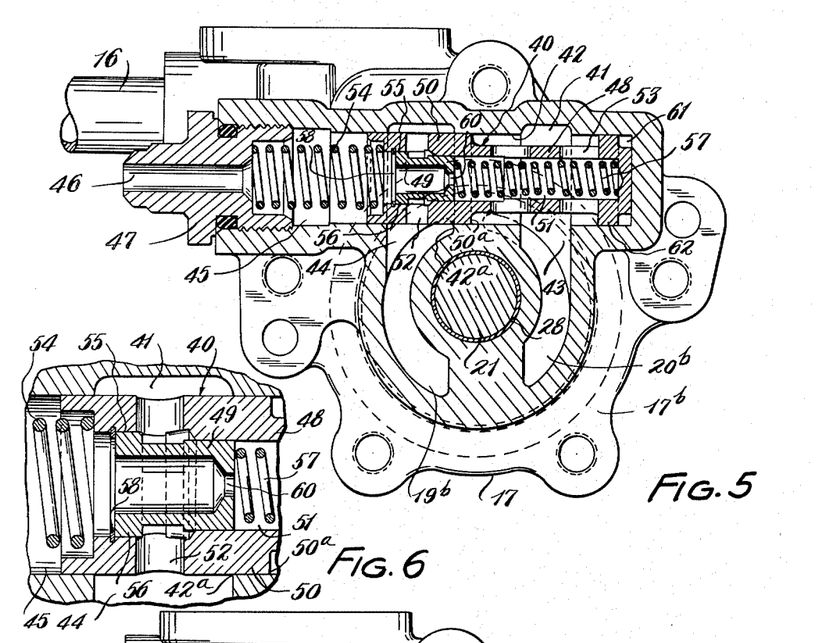
Fig. 5 is a vertical section taken through the valve mechanism of the pump, the view being taken on section line 5—5 of Fig. 3.
Fig. 6 is a fragmentary sectional view on an enlarged scale corresponding substantially with a portion of Fig. 5 and further illustrating the valve mechanism thereof.

As shown in the drawings, a portion of the cover member 17b has a substantially cylindrical valve chamber 41 formed therein which extends in spanning relation to the pair of intake and discharge ports 19b and 20b. The valve chamber 41 is provided at an intermediate point thereof with an internal annular valve seat 42. Inwardly of the valve seat 42, the valve chamber 41 is in communication with the discharge port 20b through a connecting passage 43. Outwardly of the valve seat 42, the valve chamber 41 is in communication with the intake port 19b through a connecting passage 44. The outer end portion of the valve chamber 41 forms a delivery passage 45 for the pumped fluid and with which the delivery conduit 16 of the external fluid circuit 13 is connected through the passage 46 of the fitting or plug 47.

The valve means 40 which is operable in the valve chamber 41 is in the form of a valve assembly comprising a volume control valve member 48 and a pressure relief valve member 49. The volume control valve member 48 comprises a hollow valve member having a valve plunger portion 50 which is slidable in the valve chamber 41 and sealingly cooperates with the valve seat 42. The valve member 48 has an axial passage 51 therein and the valve plunger portion 50 of this valve member has a pair of by-pass ports 52 therein which communicates with the connecting passage 44 leading to the intake port 19b.

The wall of the hollow valve member 48 is provided with one or more openings 53 at a point inwardly of the valve plunger portion 50 and which connect the axial passage 51 of this valve member with the connecting passage 43 leading from the discharge port 20b. A compression spring 54 disposed between the fitting 47 and the outer end of the valve member 48 urges the latter toward the right as seen in Fig. 5 and tends to shift the valve member toward a position of closed engagement of the valve plunger portion 50 with the valve seat 42.

The pressure relief valve member 49 of the valve assembly 40 is located in the outer end of the axial passage 51 of the hollow valve member 48 and is in the form of a slidable plunger which controls the by-pass ports 52. Adjacent the by-pass ports 52, the hollow valve member 48 is provided with an internal annular valve seat 55 with which the valve plunger portion 56 of the pressure relief valve member 49 sealingly cooperates. A compression spring 57 located in the axial passage 51 of the hollow valve member 48 is disposed between the inner end of this valve member and the inner end of the pressure relief valve member 49 and urges the latter toward the left as seen in Fig. 5, toward a position of closed engagement with the valve seat 55. The pressure relief valve member 49 is retained in the hollow valve member 48 by a spring retaining ring 58.

An important feature of the control valve mechanism 40 here shown is that it embodies a permanently open flow control orifice 60 which, in this instance, is located in the inner end of the pressure relief valve member 49. The delivery passage 45 of the pump 10 is connected with the discharge port 20ᵇ through this permanently open flow control orifice 60.

To first explain the volume control function of the valve mechanism 40 in a general way, it is pointed out that under normal operating conditions the delivery passage 45 of the pump 10 is filled with pumped fluid under the pressure of the fluid being supplied to the closed-loop external fluid circuit 13 through the delivery conduit 15. This fluid pressure acts continuously against the outer ends of the volume control valve member 48 and the pressure relief valve member 49, that is to say, this pressure acts continuously against the outer end of the valve assembly 40. When the pump 10 is being driven at a speed such that the volume of pumped fluid being delivered through the discharge port 20ᵇ is in excess of that required in the external fluid circuit, the valve assembly 40 is shifted toward the left in opposition to the spring 54 causing an opening of the valve member 48 to permit such excess fluid to be returned directly to the intake port 19ᵇ.

To explain the volume control function in greater detail it is pointed out that the fluid which is in the valve chamber 41 at the right of the orifice 60 can be referred to as being upstream relative to the orifice. The fluid in the portion of the valve chamber constituting the delivery passage 45 can be referred to as being downstream with respect to the orifice 60. The pressure of the fluid on the upstream side of the orifice 60 is greater than the pressure of the fluid on the downstream side of the orifice and the difference in these pressures is referred to as the differential pressure across the orifice.

In accordance with a known law of physics, this differential pressure varies with the rate of flow through the orifice such that the greater the flow of fluid through the orifice, the greater the differential pressure will be. The construction of the valve assembly 40 is such that the effective area which is subjected to the pressure of the upstream fluid is substantially equal to the effective area which is subjected to the pressure of the downstream fluid. The valve assembly is, therefore, substantially balanced except for the force of the compression spring 54 and the pressure differential across the orifice 60.

When the speed of the pump 10 increases, as just above mentioned, the pressure of the upstream fluid in the valve chamber 41 will increase and will produce an increased rate of flow through the orifice 60 and the pressure differential across the orifice will likewise increase. The resultant effect of the increased pump speed will be to produce a movement of the valve assembly 40 toward the left against the action of the spring 54, such that the annular edge or shoulder 50ᵃ of the valve plunger portion 50 will move past the annular edge or shoulder 42ᵃ of the valve seat 42 to establish communication between the discharge port 20ᵇ and the intake port 19ᵇ. Thereupon, pumped fluid will be by-passed from the discharge port to the intake port in an amount depending upon the extent of the opening movement of the plunger portion 50 of the valve member 48 and will result in the volume of fluid being supplied to the external fluid circuit 13 being automatically maintained substantially constant.

The pressure relief valve member 49 is constructed so that the right hand end thereof, which is exposed to the pressure of the upstream fluid, is of a smaller area than the left hand end which is exposed to the pressure of the downstream fluid. Whenever operating conditions are such that the pressure of the fluid in the discharge passage 45 and in the closed-loop external fluid circuit 13 increases above a desired value, such pressure increase will move the valve member 49 toward the right against the action of the spring 57. This movement of the valve member 49 is an opening movement causing the by-pass ports 52 to be partially uncovered to establish communication between the delivery passage 45 and the intake port 19ᵇ. This will result in fluid being by-passed from the delivery passage 45 into the intake port 19ᵇ in an amount depending upon the extent of opening movement of the pressure relief valve member 49.

It will be observed that the fluid which is by-passed by the pressure relief valve member 49 is fluid which has already traversed the orifice 60, and hence, the pressure control function of this valve member will be very effective in maintaining the fluid in the delivery passage 45 and in the external fluid circuit 13 substantially at the desired pressure value.

The valve chamber 41 is of such construction that the inner end thereof defines a dashpot chamber or cylinder 61. A plunger 62 formed on or carried by the inner end of the volume control valve member 48, operates in this dashpot cylinder. The dashpot means formed by the cylinder 61 and the plunger 62, provides an additional bearing surface and aligning means for the movable valve member 48, and the dashpot action produced is effective on the valve member 48 to substantially eliminate the tendency for this valve member to oscillate or chatter. The dashpot means, therefore, assures smoother and more efficient operation of the valve assembly 40 throughout a long period of life.

Figure 7:
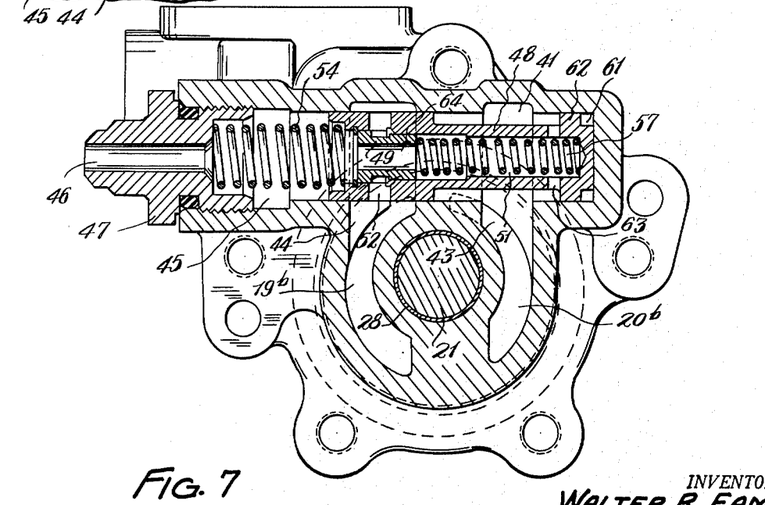
Fig. 7 is a vertical section similar to Fig. 5, but showing a modified form of valve mechanism.

Fig. 7 of the drawings shows a rotary pump and its control valve mechanism which are substantially identical with those illustrated in Figs. 1 to 5 inclusive, but in which the permanently open flow control orifice is located in a different position. In view of the similarity in construction, the same corresponding parts in Fig. 7 have been designated by the same reference characters.

In the modified construction of Fig. 7, the permanently open flow control orifice 63 is formed by one or more radial passages, in this instance two such passages, located in the side wall of the movable valve member 48 so as to constitute the sole path of communication between the discharge port 20ᵇ and the axial passage 51 of this valve member. The pressure relief valve member 49 differs from the pressure relief valve member of Fig. 5 in that the former has a relatively large connecting passage 64 extending axially therethrough in place of the flow control orifice 60.

In the operation of the modified construction of Fig. 7, the pressure differential across the flow control orifice 63 functions in the same manner as has already been described above in connection with Fig. 5 to cause opening movement of the valve member 48 for by-passing pumped fluid from the discharge port 20ᵇ to the intake port 19ᵇ for maintaining a substantially constant rate of fluid delivery of pumped fluid to the external fluid circuit. The effective area of the outer end of the pressure relief valve member 49 is larger than the effective area of the inner end of this valve member and the action of the pressure of the pumped fluid thereon causes this valve member to function in the same manner as has been explained above in connection with Fig. 5 to produce an opening movement for by-passing more or less fluid to the intake port 19ᵇ and thus automatically maintaining the pressure of the fluid in the discharge passage 45 and in the external fluid circuit at a desired substantially constant pressure value.

Figs. 8 to 14 inclusive of the drawings show another rotary pump 66 forming a part of a similar pumping unit, but such pump being of a somewhat different construction. The pump 66 comprises connected body and cover members 67 and 68 defining a substantially cylindrical rotor chamber 69 and containing pairs of intake and discharge ports 70ᵃ, 70ᵇ and 71ᵃ, 71ᵇ. A pair of outer and inner rotor members 72 and 73 of the gear type are operable in the rotor chamber 69 and define pumping chambers 74 which communicate in succession with the intake and discharge ports. The outer rotor member 72 is supported in a bushing or liner 75 of the body member 67 and the inner rotor member 73 is supported by a shaft 76 and connected therewith by a key 77.

Figures 10, 11:
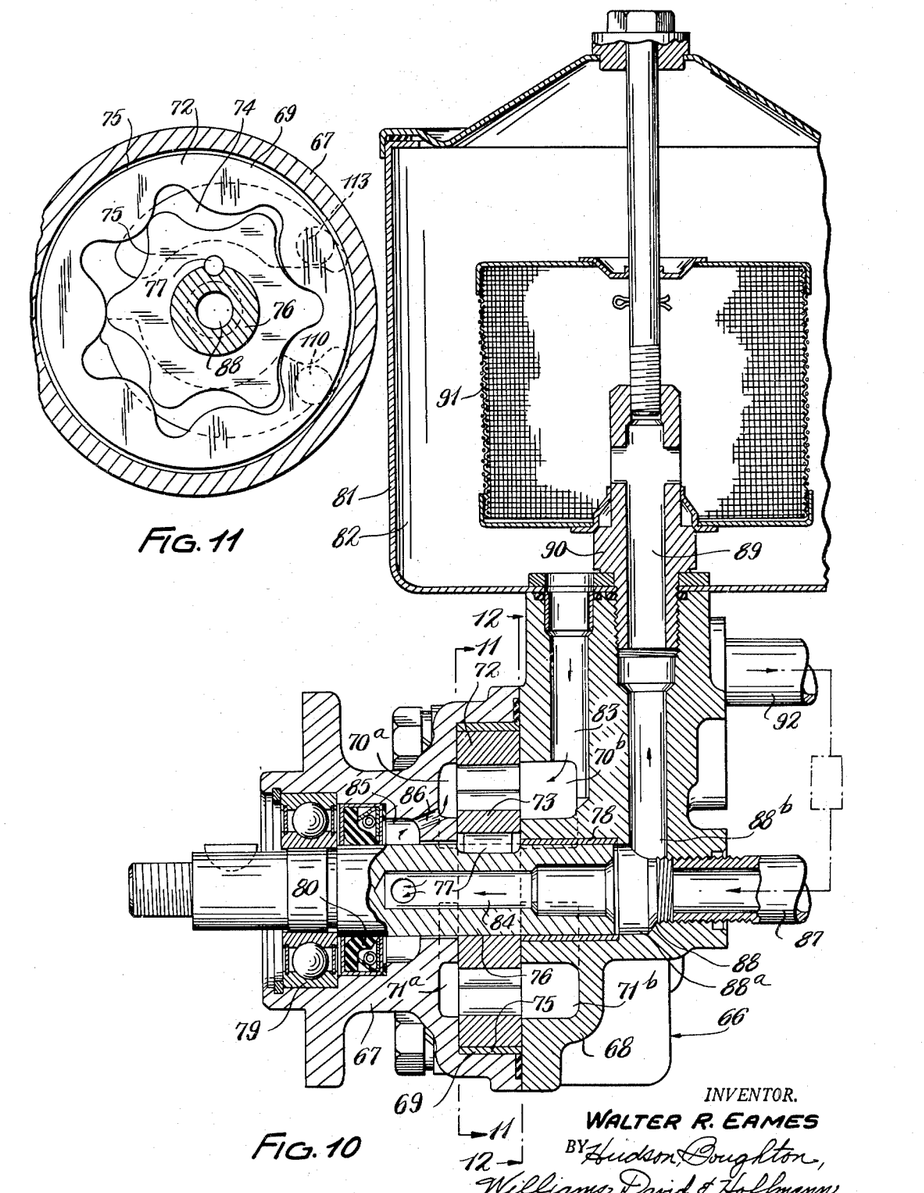
Fig. 10 is a vertical section through this modified pump taken substantially as indicated by section line 10—10 of Fig. 9.
Fig. 11 is a partial vertical section taken on section line 11—11 of Fig. 10 and showing the cooperating toothed rotors of this modified pump.
Figure 12:
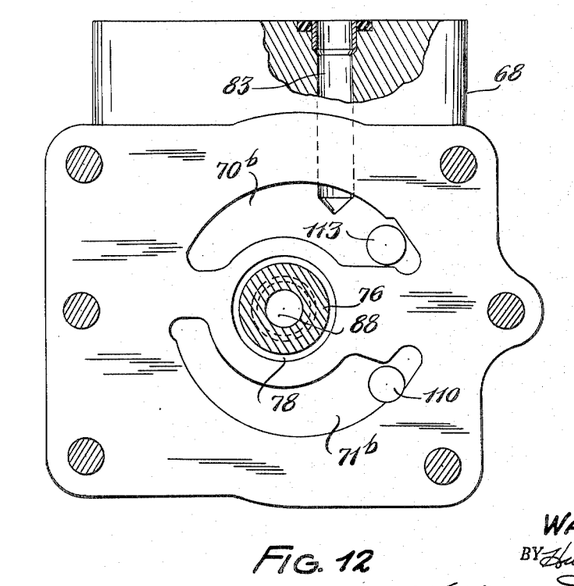
Fig. 12 is another vertical section of this modified pump taken on section line 12—12 of Fig. 10 and showing the intake and discharge ports.

The shaft 76 is supported at its outer end by a bushing 78 of the cover member 68 and its other or inner end extends through and is rotatably supported by an antifriction bearing 79 mounted in the body member 67. The inner end of the shaft 76 extends through and is sealed by an annular packing means 80 and is adapted for connection with some rotatable part of the motor vehicle to be driven therefrom.

A reservoir 81 in the form of a cup-shaped member mounted directly on the cover member 68 defines a reservoir chamber 82 from which fluid is supplied to the intake port 70$^b$ through the downwardly extending passage 83. The shaft 76 contains an axial passage 84 which communicates with the intake port 71 through an annular chamber 85 and a connecting passage 86 of the body member 67. Fluid under pressure being returned from a closed-loop external fluid circuit through a return conduit 87 is supplied to a branched passage 88 of the cover member 68. A passage portion 88$^a$ of the branched passage 88 communicates with the axial passage 84 of the shaft 76 for supplying fluid to the intake port 70$^a$ through the chamber 85 and the connecting passage 86. A branch passage portion 88$^b$ extending upwardly in the cover member 68 supplies some of the return fluid to the reservoir chamber 82 through the passage 89 of the fitting 90.

The fitting 90 forms a support for a strainer 91 located in the reservoir chamber 82. The resistance which the strainer 91 offers to the passage of the return fluid therethrough causes the return fluid in the branch passage portions 88$^a$ and 88$^b$ to be maintained under a back pressure sufficient to insure the intake port 70$^a$ being maintained filled with fluid at all times during the operation of the pumping unit. The intake port 70$^b$ is similarly maintained filled with fluid under the pressure head of the fluid contained in the reservoir chamber 82.

Figure 8:
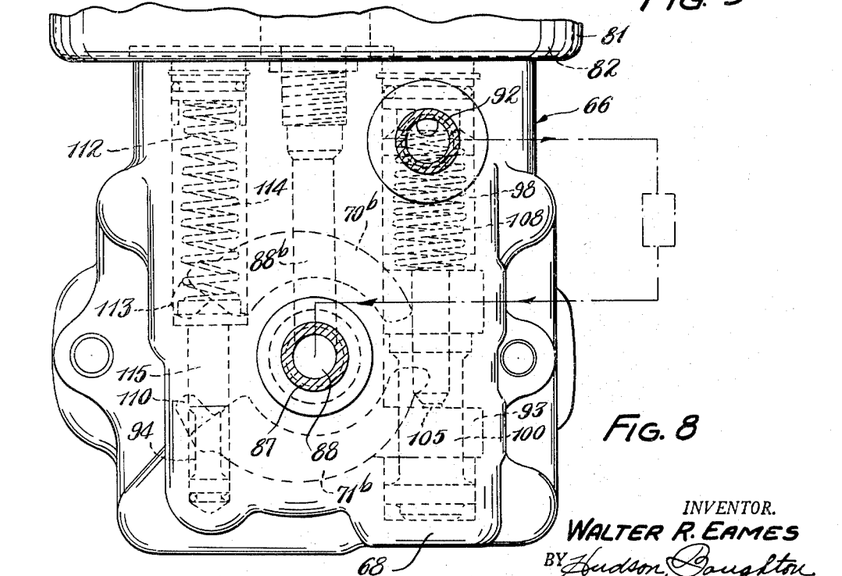
Fig. 8 is an end elevation of a pumping unit similar to that of Fig. 1, but showing a modified form of rotary pump embodied therein.
Figure 9:
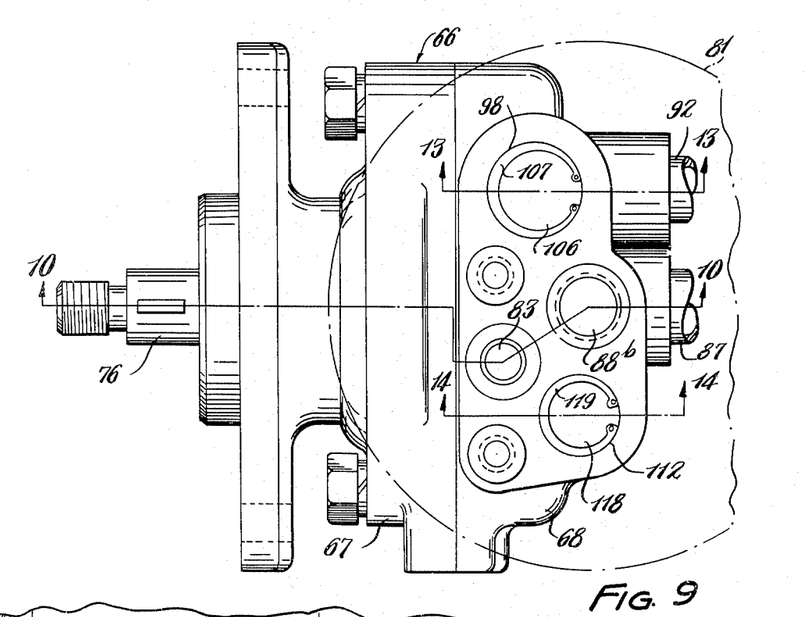
Fig. 9 is a top plan view of the modified pump of Fig. 8.

The operation of the pump 66 in supplying pressure fluid to the external fluid circuit through the delivery conduit 92 is similar to the operation of the pump 10 described above, in that the pumped fluid being supplied to the external circuit is maintained at desired volume and pressure values by the operation of by-pass valve means located within the pump housing and which will be described next.

Figure 13:
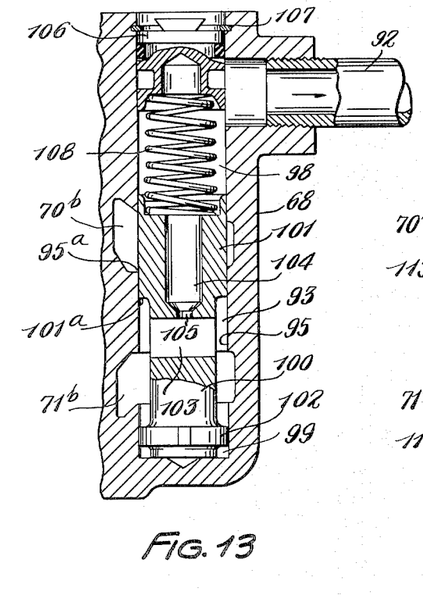
Fig. 13 is a partial vertical section taken on section line 13—13 of Fig. 9 and showing the volume control valve means of this modified pump.

Portions of the cover member 68 define a pair of valve chambers 93 and 94 which are disposed in substantially parallel relation and span the intake and discharge ports 70$^b$ and 71$^b$. As shown in Fig. 13, the valve chamber 93 is provided with an internal annular valve seat 95 at an intermediate point thereof. The portion of this valve chamber below the valve seat 95 is in direct communication with the discharge port 71$^b$. The portion of the valve chamber above the valve seat 95 is in direct communication with the intake port 70$^b$. The upper portion of the valve chamber 93 forms a delivery passage 98 through which the pumped fluid is supplied to the delivery conduit 92 of the external fluid circuit. The extreme lower portion of the valve chamber 93 forms a dashpot chamber or cylinder 99.

A volume control valve member 100 is located in the valve chamber 93 and comprises an upper valve plunger portion 101 which sealingly cooperates with the valve seat 95 and a dashpot plunger 102 at the lower end thereof which is operable in the dashpot cylinder 99. The valve member 100 is also provided with a transverse opening 103 and an axial passage 104 which are connected by a permanently open flow control orifice 105, such that the delivery passage 98 is connected with the discharge port 71$^b$ through this orifice.

The valve chamber 93 is closed at its upper end by a plug 106 which is retained therein by a spring ring 107. A compression spring 108 located in the delivery passage 98 is disposed between the plug 106 and the upper end of the valve member 101.

The effective areas of the valve member 100 which are subjected to the pressures of the pumped fluid on the upstream and downstream sides of the orifice 105 are substantially equal such that valve member will be responsive to the resultant effect of the pressure differential across the orifice 105 and the force of the spring 108.

When operating conditions are such that the speed of the pump 66 increases, the pressure differential across the orifice 105 will cause the valve member 100 to be moved upwardly in the valve chamber 93 against the action of the spring 108. This will cause the annular edge 101$^a$ of the valve plunger portion 101 to move past the annular edge 95$^a$ of the valve seat 95, thereby establishing communication between the discharge port 71$^b$ and the intake port 70$^b$ and permitting pumped fluid to be by-passed quietly and efficiently within the pump structure from the discharge port to the intake port. The amount of fluid being by-passed by the valve member 100 will depend upon the extent of opening movement thereof and will result in the rate or volume of fluid delivery to the external fluid circuit through the delivery passage 98, being automatically maintained at a desired substantially constant value.

The operation of the plunger 102 in the dashpot cylinder 99 provides additional bearing surface for the valve member 100 for maintaining the same in properly aligned relation in the valve chamber 93, and the dashpot action of the plunger in the cylinder causes the valve member to be stabilized with respect to its movements in the valve chamber for the elimination of undesired oscillations and chattering of this valve member.

Figure 14:
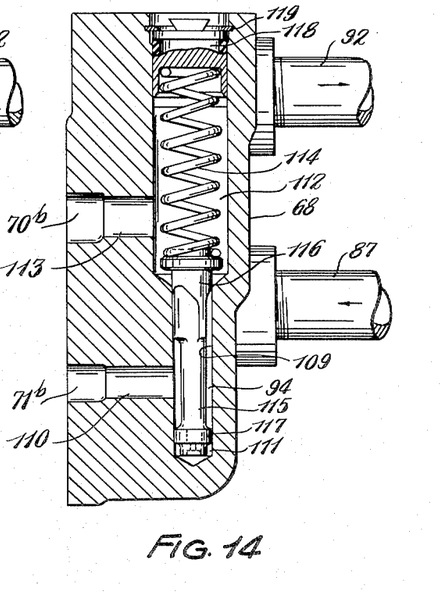
Fig. 14 is a partial vertical section taken on section line 14—14 of Fig. 9 and showing the pressure relief valve means of this modified pump.

The valve chamber 94 of the pressure relief valve means is provided at an intermediate point thereof with an annularly continuous surface forming an internal valve seat 109. The portion of the valve chamber 94 below the valve seat 109 is in communication with the discharge port 71$^b$ through a connecting passage 110 and the extreme lower end of this valve chamber forms a dashpot cylinder 111. Above the valve seat 109, the valve chamber 94 is enlarged to form a spring chamber 112 which is in communication with the intake port 70$^b$ through a connecting passage 113. A compression spring 114 is located in the chamber 112.

A pressure relief valve member 115 is located in the valve chamber 94 and comprises an upper valve plunger portion 116 which sealingly cooperates with the valve seat 109 and a lower portion forming a dashpot plunger 117 which is operable in the dashpot cylinder 111. The enlargement 112 of the valve chamber 94 is closed at its upper end by a plug 118 which is retained therein by a spring ring 119. The spring 114 is disposed between the plug 118 and the upper end of the valve member 115 and acts on the latter to urge the valve plunger portion 116 toward its closed position relative to the valve seat 109.

When the operating conditions of the rotary pump 66 are such that the pressure of the pumped fluid being supplied to the external fluid circuit increases above a desired value, the valve member 115 will be moved upwardly against the action of the spring 114 causing the valve plunger portion 116 to disengage the seat 109. This movement of the valve member 115 causes communication to be established between the discharge port 71$^b$ and the intake port 70$^b$ for by-passing pumped fluid to the latter. The amount of fluid which is thus by-passed to the intake port will depend upon the extent of opening movement of the valve member 115 and will cause the pressure of the fluid being supplied to the external fluid circuit to be automatically maintained at a desired substantially constant value.

Figs. 15 to 20 inclusive of the drawings show another modified form of rotary pump 122 which forms a part of a pumping system similar to those described above and which includes an external fluid circuit represented by the delivery and return conduits 123 and 124. The pumping system also includes a reservoir member 125 mounted directly on the pump and containing a reservoir chamber 126.

Figure 18:
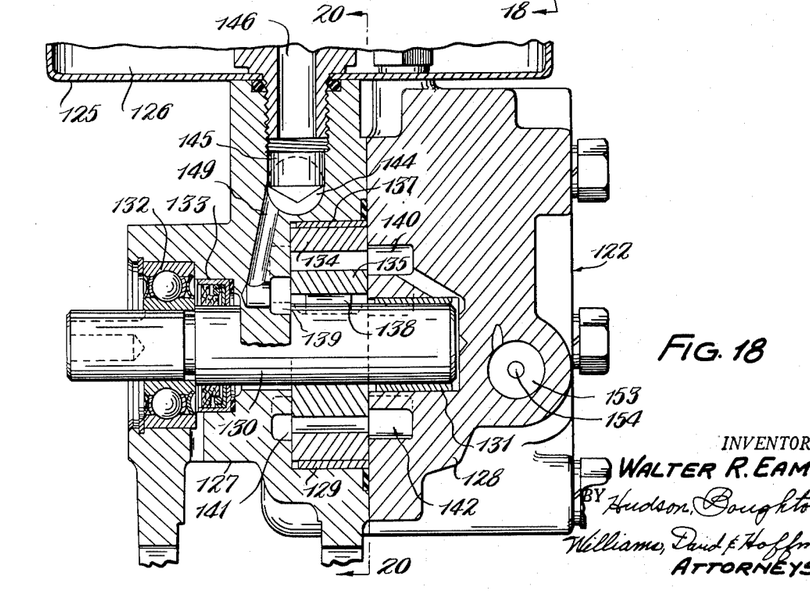
Fig. 18 is a vertical section taken on the irregular section line 18—18 of Fig. 17.

The pump 122 comprises connected body and cover members 127 and 128 forming a pump housing and defining a rotor chamber 129 in such housing. A shaft 130 has its outer end rotatably supported in a bushing 131 of the cover member 128. The inner end of the shaft 130 is rotatably supported by an antifriction bearing 132 mounted in the body member 127 and also extends through and is sealed by a packing means 133. The inner end of the shaft 130 projects beyond the bearing 132 and is adapted for connection with a rotatable part from which the pump 122 is to be driven.

Figure 20:
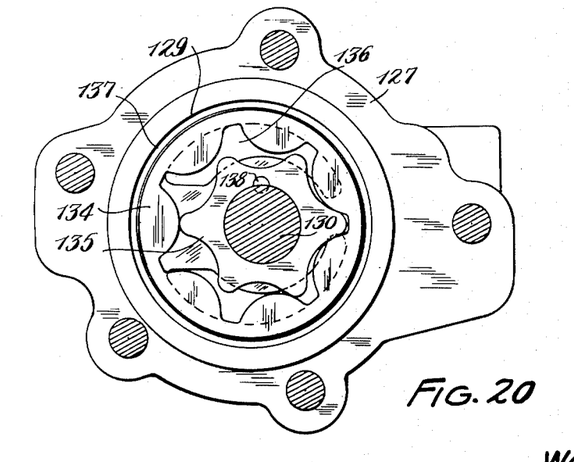
Fig. 20 is a partial vertical section taken on section line 20—20 of Fig. 18 and showing the cooperating toothed rotors of this modified pump.

The pump 122 also comprises outer and inner toothed rotor members 134 and 135 having cooperating portions thereof in meshing engagement for defining pumping chambers 136. The outer rotor member 134 is rotatably supported in the body member 127 by a bushing or liner 137. The inner rotor member 135 is supported by the shaft 130 and connected therewith by the key 138.

A pair of intake ports 139 and 140 are formed in the body and cover members 127 and 128 and are located on opposite sides of the rotor chamber 137 for supplying fluid to the pumping chambers 136 from opposite sides thereof. Discharge ports 141 and 142 formed in the body and cover members 127 and 128 are also located on opposite sides of the rotor chamber 129 and with which the pumping chambers 136 communicate in succession.

Figure 17:
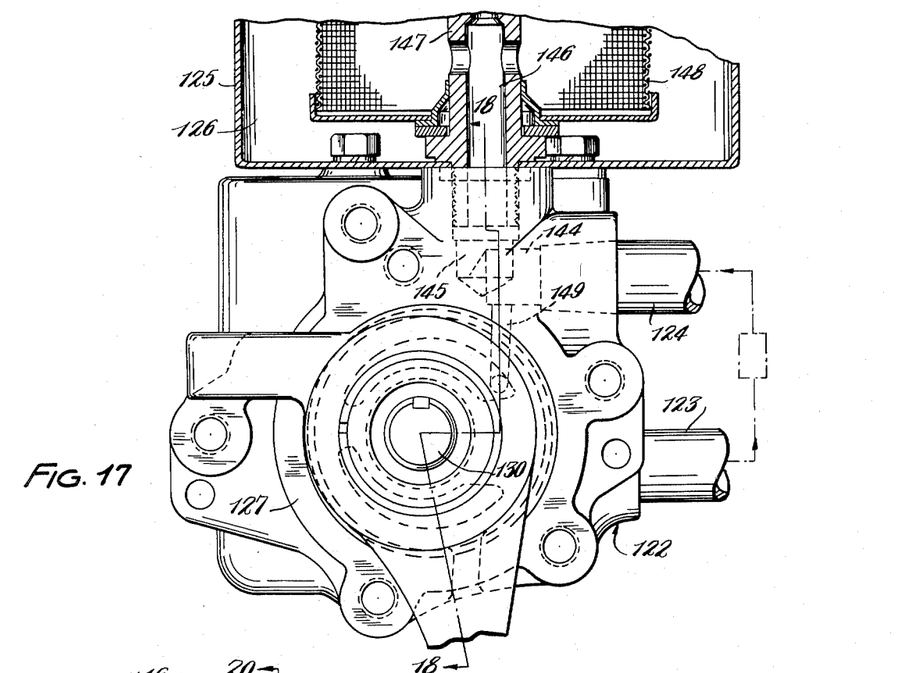
Fig. 17 is an end elevation showing the pumping unit of Fig. 15 as seen from the opposite end and with the reservoir shown in partial vertical section.

Fluid is supplied to the intake port 140 from the reservoir chamber 126 through a downwardly extending intake passage 143 provided in the cover member 128. Fluid under pressure being returned from the external fluid circuit through the return conduit 124 enters the branched passage 144 of the body member 127. A portion of such returning fluid flows upwardly through the branch passage 145 and through the passage 146 of the fitting 147 into the reservoir chamber 126 through the screen 148. Another portion of the returned fluid flows downwardly through the branch passage 149 to the intake port 139. The resistance offered by the screen 148 to the passage of fluid therethrough causes the return fluid in the branched passage 144 to be maintained under a back pressure sufficient to insure the intake port 139 being maintained substantially filled with fluid at all times during the operation of the pump. The intake port 139 is maintained filled by the pressure of the head of fluid in the reservoir chamber 126.

Figure 15:
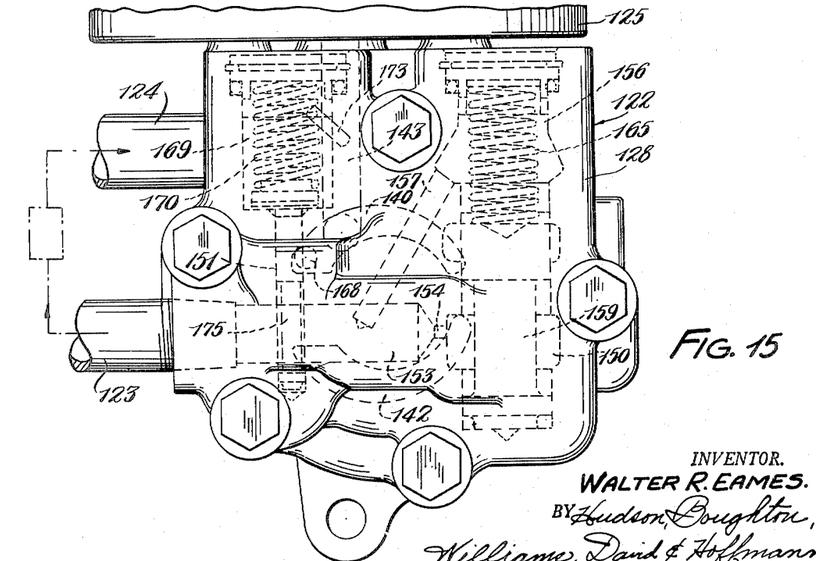
Fig. 15 is an end elevation of a pumping unit similar to those of Figs. 1 and 8, but showing another modified form of rotary pump embodied therein.
Figure 16:
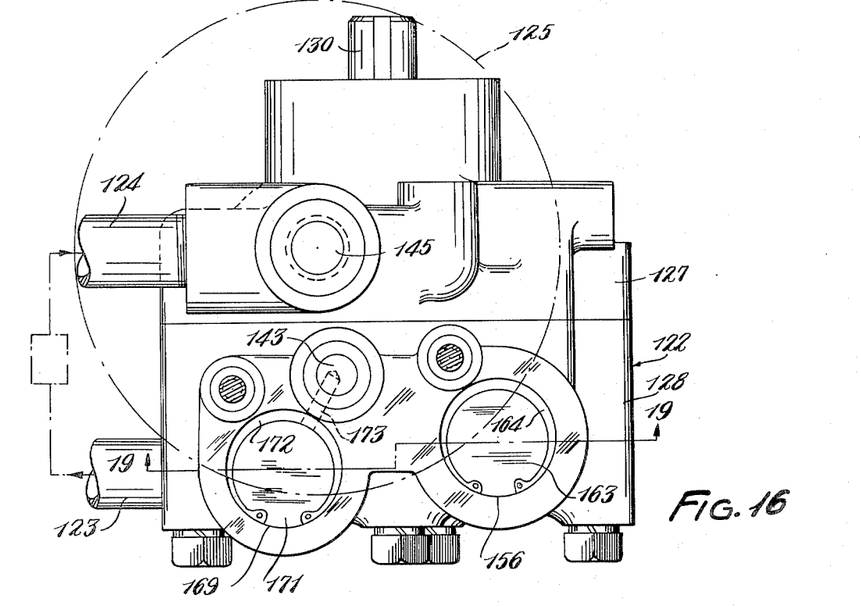
Fig. 16 is a top plan view of the modified pump of Fig. 15.
Figure 19:
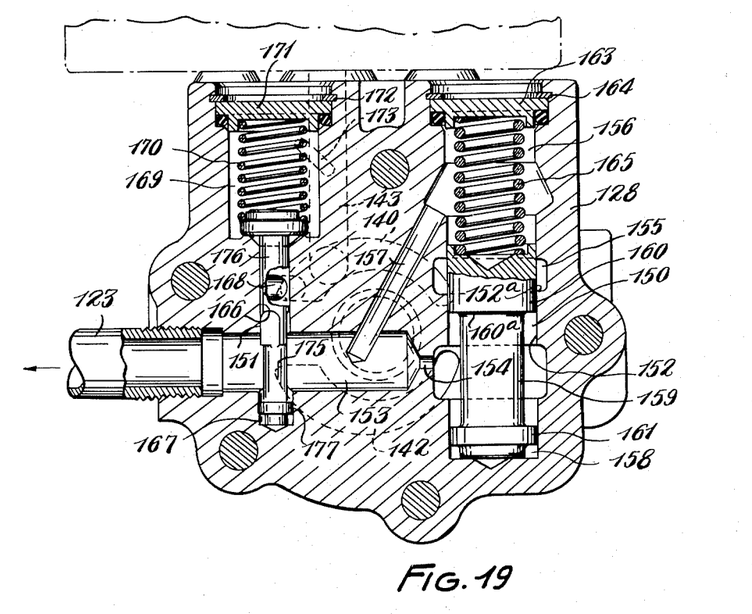
Fig. 19 is a vertical section taken through the valve mechanism of the modified pump of Fig. 15, the view being taken substantially on section line 19—19 of Fig. 16.

Portions of the housing of the pump 122 define a pair of valve chambers 150 and 151 extending in substantially parallel relation in the cover member 128 as shown in Figs. 15 and 19. The valve chamber 150 extends in spanning relation to the pair of intake and discharge ports 140 and 142 and is provided at an intermediate point thereof with an internal annular valve seat 152. The portion of this valve chamber immediately below the valve seat 150 is in direct communication with the discharge port 142. This portion of the valve chamber is also in communication with a fluid delivery passage 153 formed in the cover member 128, through a permanently open flow control orifice 154. The outer end of the delivery passage 153 is in communication with the supply conduit 123 of the external fluid circuit for supplying the pumped fluid thereto.

A portion 155 of the valve chamber 150 immediately above the valve seat 152, is in communication with the intake port 140 and the upper end portion 156 of this valve chamber is in communication with the delivery passage 153 through a connecting passage 157. The extreme lower end of the valve chamber 150 forms a dashpot cylinder 158.

A volume control valve member 159 is operable in the valve chamber 150 and comprises an upper valve plunger portion 160 which sealingly cooperates with the valve seat 150 and a dashpot plunger 161 carried by or formed on the lower end of this valve member and operable in the dashpot cylinder 158. The portion 156 of the valve chamber 150 is closed at its upper end by a plug 163 which is retained therein by a spring ring 164. A compression spring 165 located in the chamber portion 156 is disposed between the closure plug 163 and the upper end of the valve member 159.

In the construction just described above, it will be seen that the fluid in the lower portion of the valve chamber 150 is on the upstream side of the flow control orifice 154 and acts on the lower end of the valve member 159. The fluid in the delivery passage 153 is on the downstream side of the flow control orifice 154 and the pressure of this fluid acts on the upper end of the valve member 159 through the connecting passage 157. The effective areas of the valve member 159 which are subjected to these upstream and downstream fluid pressures are substantially equal, such that this valve member will be responsive to the pressure differential across the orifice and to the force of the spring 165.

When the operating conditions are such that the rotary pump 122 is being driven at an increased speed such that fluid is being delivered by the pump at a volume value in excess of that required by the external fluid circuit, the resultant effect of the force of the spring 165 and the pressure differential across the orifice 154 is such that the valve member 159 will be moved upwardly in the valve chamber 150. This movement of the valve member 159 causes the annular edge 160ª of the valve plunger portion 160 to move past the annular edge 152ª of the valve seat 152 thereby establishing communication between the discharge port 142 and the intake port 140 for by-passing pumped fluid to the latter. The amount of the fluid which is thus by-passed to the intake port 140 will depend upon the extent of the opening movement of the valve member 159 and will be such as to cause the volume delivery of fluid into the external circuit to be automatically maintained at a desired substantially constant value.

The dashpot plunger 161 operating in the dashpot cylinder 158 provides additional bearing surface for maintaining and supporting the valve member 159 in properly aligned relation in the valve chamber 150, and the dashpot action produced by the plunger in the cylinder will stabilize the movements of the valve member 159 to prevent undesired oscillations or chattering thereof.

The valve chamber 151 of the pressure relief valve means is provided with an annularly continuous surface defining an internal valve seat 166 at an intermediate point thereof. Below the valve seat 166, this valve chamber is in communication with the delivery passage 153 and a portion of the valve chamber extending below this delivery passage forms a dashpot cylinder 167. Immediately above the valve seat 166, the valve chamber 151 is in communication with the intake port 140 through a connecting passage 168.

An enlarged upper end portion of the valve chamber 151 forms a spring chamber 169 in which a compression spring 170 is located. The spring chamber 169 is closed at its upper end by a plug 171 which is retained therein by a spring ring 172. The spring chamber 169 is in communication with the intake passage 143 through a connecting passage 173.

A pressure relief valve member 175 is located in the valve chamber 151 and comprises a valve plunger portion 176 which sealingly cooperates with the valve seat 166. The valve member 175 also comprises a dashpot plunger 177 which is formed on or carried by the lower end of this valve member and operates in the dashpot cylinder 167. The compression spring 170 is disposed between the closure plug 171 and the upper end of the valve member 175 and urges the latter toward a position of closed engagement of the valve plunger portion 176 with the valve seat 166.

When the operating conditions of the pump 122 are such that the pumped fluid being delivered through the passage 153 is of a pressure value greater than that required in the external fluid circuit, the pressure relief valve member 175 will be moved upwardly against the action of the spring 170 causing the valve plunger portion 176 to partially uncover the connecting passage 173 to thereby establish communication between the delivery passage 153 and the intake port 140. This opening movement of the valve member 175 permits pumped fluid to be by-passed efficiently and quietly to the intake port 140 from the delivery passage 153. The amount of fluid which is thus by-passed to the intake port 140 will depend upon the extent of opening movement of the pressure relief valve member 175 and will be such that the pressure of the fluid being delivered to the external fluid circuit will be automatically maintained at a desired substantially constant value.

The operation of the dashpot plunger 177 in the dashpot cylinder 167 will provide additional bearing surface for the pressure relief valve member 175 for supporting and maintaining the same in properly aligned relation in the valve chamber 151. The dashpot action produced by the plunger and cylinder will stabilize the movements of the valve member 175 to effectively prevent undesired oscillations or chattering thereof.

With respect to the fluid which is by-passed to the intake port 140 by the pressure relief valve member 175, it will be observed that this fluid is from the downstream side of the flow control orifice 154, that is to say, is fluid which has already traversed this orifice. The action of the pressure relief valve member 175 will accordingly be very effective in maintaining the pressure of the fluid being supplied to the external fluid circuit at the desired substantially constant value.

From the foregoing detailed description and the accompanying drawings, it will now be readily understood that this invention provides forms of positive displacement rotary pumps which are well suited for use in supplying fluid under pressure to a closed-loop external fluid circuit and which embody control valve mechanism by which the volume and pressure values of the fluid thus supplied will be automatically maintained at the values desired for the external fluid circuit, regardless of wide variations occurring in the speed at which the pumps are driven. It will now also be understood that the control valve mechanism herein provided includes a volume control valve device and a pressure relief valve device, both of which are responsive to the pressure of the pumped fluid and operate to by-pass fluid from the discharge side of the pump to the intake side thereof and which such by-passing of pumped fluid takes place efficiently and quietly within the pump structure such that objectionable noises in the external fluid circuit will be substantially prevented. It will likewise be seen that this control valve mechanism involves the use of a permanently open flow control orifice and that the volume control valve device is responsive to a pressure differential across this orifice. Additionally, it will be seen that the valve devices of the control valve mechanism embody dashpot means for guiding and stabilizing the actions of the movable valve members.

Although the improved rotary pumps of this invention have been illustrated and described herein to a somewhat detailed extent, it will be understood of course, that the invention is not to be regarded as being limited correspondingly in scope, but includes all changes and modifications coming within the terms of the claims hereof.

Having thus described my invention, I claim:

1. In a pump of the character described, a housing having a rotor chamber therein, rotor means operable in said rotor chamber and defining variable pumping chambers therein for producing a pumping action, said housing having intake port means and discharge port means therein adapted respectively to supply intake fluid to and to receive pumped fluid from said pumping chambers, said housing also having delivery passage means therein for the external delivery of pumped fluid from the pump, valve means operable to by-pass pumped fluid from said discharge port means to said intake port means, and means defining a permanently open flow control orifice through which said delivery passage means is connected with said discharge port means, said valve means comprising a pair of relatively movable substantially coaxially disposed volume control and pressure relief valve members and said flow control orifice being located in one of said valve members, the by-pass operation of said valve means being responsive to the fluid pressure differential across said orifice.

2. In a rotary pump, a housing having a rotor chamber therein, rotor means operable in said rotor chamber and defining variable pumping chambers, said housing also having intake and discharge ports therein adapted respectively to supply intake fluid to and receive pumped fluid from said pumping chambers, portions of said housing defining a valve chamber having an internal annular first valve seat therein and having communication with said intake and discharge ports on opposite sides of said valve seat, means defining a delivery passage for the external delivery of pumped fluid from said discharge port, fluid pressure differential responsive valve plunger means operable in said valve chamber and comprising a hollow valve plunger cooperating with said first valve seat and itself having an internal annular second valve seat therein and a second valve plunger movable in said hollow valve plunger and cooperating with said second valve seat, and spring means effective on said valve plungers and urging the same toward their closed positions, said valve plunger means being effective to by-pass pumped fluid from said discharge port to said intake port for automatically maintaining the pumped fluid in said delivery passage substantially at desired volume and pressure values.

3. In a pump of the character described, a housing having a rotor chamber therein, rotor means operable in said rotor chamber for producing a pumping action, said housing having intake means and discharge means therein adapted respectively to supply intake fluid to and to receive pumped fluid from said rotor chamber, said housing also having delivery passage means therein for the external delivery of pumped fluid from the pump, means defining a permanently open flow control orifice through which said delivery passage means is connected with said discharge means, a volume control valve means operable in said housing for by-passing fluid from said discharge means to said intake means for maintaining the fluid delivery in said delivery passage means substantially at a desired volume value, and a pressure relief valve means operable in said housing for by-passing fluid from the downstream side of said orifice to said intake means for maintaining the fluid delivery in said delivery passage means substantially at a desired pressure value.

4. In a rotary pump, a housing having a rotor chamber therein, rotor means operable in said rotor chamber and defining variable pumping chambers, said housing also having intake and discharge ports therein adapted respectively to supply intake fluid to and receive pumped fluid from said pumping chambers, portions of said housing defining a valve chamber having an internal annular first valve seat therein and having communication with said intake and discharge ports on opposite sides of said valve seat, means defining a delivery passage for the external delivery of pumped fluid from said pump, valve means operable in said valve chamber and comprising a volume control valve member and a pressure relief valve member, said volume control valve member comprising a hollow valve plunger cooperating with said first valve seat and itself having an internal annular second valve seat therein, said relief valve member comprising a second valve plunger movable in said hollow valve plunger and cooperating with said second valve seat, a first spring means effective on said volume control valve member and urging the same toward its closed position, a second spring means effective on said relief valve member and urging the same toward its closed position, and means defining a permanently open flow control orifice through which said delivery passage is connected with said discharge port, said volume control valve member being responsive to the resultant effect of said first spring means and the fluid pressure differential across said orifice for by-passing fluid from said discharge port to said intake port for maintaining the fluid delivery in said delivery passage substantially at a desired volume, said relief valve member being responsive to the resultant effect of said second spring means and the fluid pressures acting on opposite ends of said relief valve member for by-passing fluid from the downstream side of said orifice to said intake port for maintaining the fluid delivery in said delivery passage substantially at a desired pressure.

5. In a rotary pump, a housing having a rotor chamber therein and a pair of intake and discharge ports communicating with said rotor chamber at spaced points, rotor means operable in said rotor chamber and defining variable pumping chambers therein for producing a pumping action, portions of said housing defining a substantially cylindrical valve chamber spanning said intake and discharge ports and having an annular first valve seat therein at a point intermediate its ends, said discharge port being in communication with said valve chamber at a point between the inner end of the valve chamber and said first valve seat and said intake port being in communication with said valve chamber outwardly of said first valve seat, the outer end portion of said valve chamber forming a delivery passage for the external delivery of pumped fluid from the pump, a hollow valve member slidable in said valve chamber and cooperating with said first valve seat, spring means effective on said hollow valve member and urging the same toward a closed position relative to said first valve seat, said hollow valve member having therein a second valve seat and also having a by-pass port therein adjacent said second valve seat and communicating with said intake port, a second valve member movable in said hollow valve member and cooperating with said second valve seat for controlling said by-pass port, and spring means effective on said second valve member and urging the same toward a closed position relative to said second valve seat, said hollow valve member and said second valve member constituting a by-pass valve means operable to by-pass fluid from said discharge port to said intake port for automatically maintaining the fluid delivery in said delivery passage substantially at desired volume and pressure values.

6. A rotary pump as defined in claim 5 in which said second valve member has a permanently open flow control orifice therein through which said delivery passage is connected with said discharge port.

7. A rotary pump as defined in claim 5 in which said inner end of said valve chamber has a dashpot chamber therein, and in which a dashpot plunger is carried by the inner end of said hollow valve member and is operable in said dashpot chamber.

8. In a rotary pump, a housing having a rotor chamber therein and a pair of intake and discharge ports communicating with said rotor chamber at spaced points, rotor means operable in said rotor chamber and defining variable pumping chambers therein for producing a pumping action, portions of said housing defining a substantially cylindrical valve chamber spanning said intake and discharge ports and having an annular valve seat therein at a point intermediate its ends, said discharge port being in communication with said valve chamber on one side of said valve seat and said intake port being in communication with said valve chamber on the opposite side of said valve seat, the inner end of said valve chamber defining a dashpot cylinder, by-pass valve means slidable in said valve chamber in cooperation with said valve seat for by-passing fluid from the discharge side of the pump to said intake port, and a dashpot plunger carried by the inner end of said valve means and operable in said dashpot cylinder.

9. In a rotary pump, a housing having a rotor chamber therein and a pair of intake and discharge ports communicating with said rotor chamber, rotor means operable in said rotor chamber and defining variable pumping chambers therein for producing a pumping action, portions of said housing defining a valve chamber having a valve seat therein at an intermediate point and a dashpot chamber therein at its inner end, said valve chamber having communication with said intake and discharge ports on opposite sides of said valve seat, a valve member movable in said valve chamber for cooperation with said seat and having a plunger portion operable in said dashpot chamber, spring means effective on said valve member and urging the same toward a closed position relative to said seat, said housing also having a delivery passage therein for the external delivery of pumped fluid from the pump and said delivery passage having communication with said valve chamber outwardly of the outer end of said valve member, and means defining a permanently open flow control orifice through which said delivery passage is connected with the discharge port, the movement of said valve member relative to said seat being responsive to the resultant effect of the force of said spring means and the fluid pressure differential across said orifice and being stabilized by the dashpot action of said plunger portion in said dashpot chamber.

10. In an hydraulic system for vehicles and the like including a pump having pressure and suction ports and communication between the ports: a valve chamber included in said communication, valve biasing means, said valve chamber containing normally closed shiftable valve parts one within another with an annular space between and receiving said valve biasing means, at least one of said valve parts having ends of unequal diameter so as to afford end surfaces of unequal effective area and being subjected to a differential force causing the valve to shift and open when acted upon by pressure fluid, orifice means carried by one of said valve parts in a manner such as to be movable therewith and interposed in the path of fluid flow in said communication to cause a pressure drop and create a pressure differential effective on such valve part to shift and open the same, the outer valve part having a valve surface portion slidable with respect to a companion valve surface portion on each of said inner valve part and said valve chamber, and an opening in the side of said outer valve part connected by said communication to said pump suction port, the respective valve surface portions incorporated between said valve chamber and said outer valve part establishing cooperation upon relative shift between the same to pass fluid to said pump suction port, the respective valve surface portions incorporated between said inner valve part and said outer valve part establishing cooperation upon relative shift between the same to pass fluid to the said opening in the side of the outer valve part connected to said pump suction port.

11. In an hydraulic system for vehicles and the like including a pump having pressure and suction ports and communication between the ports: a valve chamber included in said communication, valve biasing means, said valve chamber containing shiftable valve parts one within another with an annular space between and receiving said valve biasing means, at least one of said valve parts having ends of unequal diameter so as to afford end surfaces of unequal effective area when acted upon by pressure fluid, orifice means carried by one of said valve parts in a manner such as to be movable therewith and interposed in the path of fluid flow in said communication, the outer valve part having a valve surface portion slidable with respect to a companion valve surface portion on each of said inner valve part and said valve chamber, and an opening in the side of said outer valve part connected by said communication to said pump suction port, the respective valve surface portions incorporated between said valve chamber and said outer valve part establishing cooperation upon relative shift between the same to pass fluid to said pump suction port in response to the force unbalance produced in the valve due to unequal fluid pressures caused by the orifice means, the respective valve surface portions incorporated between said inner valve part and said outer valve part establishing cooperation upon relative shift between the same to pass fluid to the said opening in the side of the outer valve part connected to said pump suction port in response to the force unbalance produced in the valve due to the action of the pressure of fluid on the unequal effective end areas of the said valve part ends.

12. In combination in an hydraulic pressure fluid system, a valve-controlled device adapted to be moved under action of pressure fluid to perform work, a source of prime power, a source of fluid pressure differing from the atmosphere comprising pumping means having an input shaft driven at varying rates of speed by said power source such that the fluid pumped varies in effective flow rate and in effective pressure, bypassed communication between the source of fluid pressure and said device and cooperating with the control valve to provide continuous flow of pressure fluid in the system and to provide divertable streams thereof to control the application of the pressure to said device, and valving included in said communication to control the bypass and formed of a pair of hollow valve parts received by a third hollow valve part and arranged one within another with annular spaces between, a plurality of biasing means in the annular spaces acting between different ones of said valve parts to oppose movement of the valve parts out of closed position, the parts being relatively reciprocative and the outer part of the pair of parts having a port in the wall thereof along the line of reciprocation of the inner of the pair of parts, and the third part having a port in the wall thereof along the line of reciprocation of the outer part of said pair of valve parts, one of the valve parts of said pair having the opposite ends thereof of dissimilar diameter so as to present dissimilar areas of end surface exposed to fluid pressure and move in response to excessive pressure build-up to uncover the port along the corresponding path of reciprocation thereof, and orifice means interposed in said communication in the path of fluid flow and connected for movement with at least one of said pair of valve parts so as to uncover the port along the corresponding path of reciprocation thereof in response to predetermined pressure drop across said orifice means due to predetermined rate of flow of fluid therethrough, said ports being connected to said bypass for bypassing fluid to limit the maximum flow rate and pressure of the continuously flowing stream of pressure fluid traversing the system through said communication as a result of the pumping action of said variably driven pumping means.

13. In a control valve construction having inlet and outlet passages for pressure fluid and an interposed chamber means through which a fluid flow path leads from one passage to the other, a compound valve assembly movable within the chamber means and cooperating therewith to form first and second controlled passages connected to a bypass outlet spaced apart with respect to the inlet and outlet passages, said compound assembly including a pressure-differential-producing orifice interposed in the fluid flow path within the chamber means and comprising telescopically related hollow valves, one controllably covering said first passage and being pressure movable for progressively opening the same in response to the flow pressure differential produced by said orifice, and the other valve controllably covering the second passage and having a set of opposite ends thereon which present a difference in areas exposed to fluid pressure for forcing the valve to move under pressure to open the second passage.

14. In a control valve construction having inlet and outlet passages for pressure fluid and an interposed chamber means through which a fluid flow path leads from one passage to the other, a compound valve assembly movable within the chamber means and cooperating therewith to form first and second controlled passages connected to a secondary outlet spaced apart with respect to the inlet and outlet passages, said compound assembly including a pressure-differential-producing orifice interposed in the fluid flow path within the chamber means and comprising telescopically related hollow valves, the outer one controllably covering said first passage and being pressure movable for progressively opening the same in response to the flow pressure differential produced by said orifice, and the other valve controllably covering the second passage and having a set of opposite ends thereon which present a difference in areas exposed to fluid pressure for forcing the valve to move under pressure to open the second passage.

15. A pressure fluid control valve construction having a central bore, a compound hollow valve assembly therein and providing a restriction to fluid flow within the bore, and a lateral bypass disposed adjacent said bore, said valve assembly comprising first and second independently biased telescopically related valves, said first valve having dissimilar ends for presenting unequal opposite areas to pressure fluid to move under the differential force of pressure fluid thereagainst and progressively to open a first passage connected to the bypass, said second valve being pressure movable under the influence of the pressure difference caused by the pressure drop across the restriction for progressively opening a second passage connected to the bypass.

16. A pressure fluid control valve construction having a central bore, a compound hollow valve assembly therein and providing a permanent restriction to fluid flow within the bore, and a lateral outlet adjacent said bore, said valve assembly comprising first and second telescopically related valves, said first valve having dissimilar ends for presenting unequal opposite areas to pressure fluid to move under the differential force of pressure fluid thereagainst and progressively to open a first passage connected to the lateral outlet, said second valve being pressure movable under the influence of the pressure difference caused by the pressure drop across the restriction for progressively opening a second passage connected to the lateral outlet.

17. A pressure fluid control valve structure having a central bore, a compound hollow valve assembly therein and providing a restriction to fluid flow within the bore, and a lateral bypass disposed adjacent said bore, said valve assembly comprising first and second independently biased telescopically related valves, said first valve having dissimilar diameters for presenting unequal opposite areas to pressure fluid to shift the first valve under the differential force of pressure fluid thereagainst and progressively to open a first passage connected to the bypass, said second valve being pressure shiftable under the influence of the pressure difference caused by the pressure drop across the restriction for progressively opening a second passage independently connected to the bypass.

18. A ported flow diverting device including an independently shiftable pair of telescopically related hollow valves controlling flow to different ports, one valve of the pair incorporating a permanent restriction to flow to produce a difference in fluid pressures on the opposite ends of a valve of said pair for shifting the same, there being dissimilar ends provided on one valve of the pair to present different opposite areas exposed to the pressure fluid for creating a differential force from the pressure fluid thereagainst to shift the same.

19. In a pump of the character described, a housing having a working chamber therein, pump means operable in said working chamber for producing a pumping action, said housing having intake means and discharge means therein adapted respectively to supply intake fluid to and to receive pumped fluid from said working chamber, said housing also having delivery passage means therein for the external delivery of pumped fluid from the pump, valve means located in said pump housing and operable to by-pass pumped fluid from said discharge means to said intake means, and means defining a permanently open flow control orifice through which said delivery passage means is connected with said discharge means, the by-pass operation of said valve means being responsive to the fluid pressure differential across said orifice, said valve means comprising a movable hollow volume control valve member and a pressure relief valve member located in and substantially coaxially movable relative to said hollow volume control valve member and said flow control orifice being located in said pressure relief valve member.

20. In a rotary pump, a housing having a rotor chamber therein, rotor means operable in said rotor chamber and defining variable pumping chambers, said housing also having intake and discharge ports therein adapted respectively to supply intake fluid to and receive pumped fluid from said pumping chambers, portions of said housing defining a first valve chamber having a first valve seat therein and having communication with said intake and discharge ports on opposite sides of said first valve seat, portions of said housing also defining a second valve chamber having a second valve seat therein and having communication with said intake and discharge ports on opposite sides of said second valve seat, means defining a delivery passage for the external delivery of pumped fluid from the pump, means defining a permanently open flow control orifice in said housing externally of said valve chambers and through which said delivery passage is connected with said discharge port, a fluid pressure differential responsive volume control valve member movable in said first valve chamber and cooperating with said first valve seat, spring means effective on said volume control valve member and urging the same toward closed position, a fluid pressure responsive relief valve member movable in said second valve chamber and cooperating with said second valve seat, and spring means effective on said relief valve member and urging the same toward closed position, said volume control valve member and said relief valve member being effective to by-pass pumped fluid from said discharge port to said intake port for automatically maintaining the pumped fluid in said delivery passage substantially at desired volume and pressure values.

21. In a rotary pump, a housing having a rotor chamber therein, rotor means operable in said rotor chamber and defining variable pumping chambers, said housing also having intake and discharge ports therein adapted respectively to supply intake fluid to and receive pumped fluid from said pumping chambers, portions of said housing defining a first valve chamber having a first valve seat therein and having communication with said intake and discharge ports on opposite sides of said first valve seat, portions of said housing also defining a second valve chamber having a second valve seat therein and having communication with said intake and discharge ports on opposite sides of said second valve seat, means defining a delivery passage for the external delivery of pumped fluid from the pump, said delivery passage being in communication with said discharge port through one of said valve chambers, means in said housing defining a permanently open flow control orifice in said delivery passage at a downstream point thereof relative to said one valve chamber, a fluid pressure differential responsive volume control valve member movable in said first valve chamber and cooperating with said first valve seat, spring means effective on said volume control valve member and urging the same toward closed position, a fluid pressure responsive relief valve member movable in said second valve chamber and cooperating with said second valve seat, and spring means effective on said relief valve member and urging the same toward closed position, said volume control valve member and said relief valve member being effective to by-pass pumped fluid from said discharge port to said intake port for automatically maintaining the pumped fluid in said delivery passage substantially at desired volume and pressure values.

22. In a rotary pump, a housing having a rotor chamber therein, a rotor means operable in said rotor chamber and defining variable pumping chambers, said housing also having intake and discharge ports therein adapted respectively to supply intake fluid to and receive pumped fluid from said pumping chambers, portions of said housing defining a first valve chamber having a first valve seat therein and having communication with said intake and discharge ports on opposite sides of said first valve seat, portions of said housing also defining a second valve chamber having a second valve seat therein and having communication with said intake and discharge ports on opposite sides of said second valve seat, means defining a delivery passage for the external delivery of pumped fluid from the pump, said delivery passage being in communication with said discharge port through said first valve chamber, means in said housing defining a permanently open flow control orifice in said delivery passage at a downstream point thereof relative to said first valve chamber, a fluid pressure differential responsive volume control valve member movable in said first valve chamber and cooperating with said first valve seat, spring means effective on said volume control valve member and urging the same toward closed position, a fluid pressure responsive relief valve member movable in said second valve chamber and cooperating with said second valve seat, and spring means effective on said relief valve member and urging the same toward closed position, said volume control valve member and said relief valve member being effective to by-pass pumped fluid from said discharge port to said intake port for automatically maintaining the pumped fluid in said delivery passage substantially at desired volume and pressure values.

References Cited in the file of this patent

UNITED STATES PATENTS

| | | |
|---|---|---|
| 2,085,982 | Johnson | July 6, 1937 |
| 2,219,488 | Parker | Oct. 29, 1940 |
| 2,271,826 | Mercier | Feb. 3, 1942 |
| 2,279,176 | Pardee | Apr. 7, 1942 |
| 2,316,445 | Marshall | Apr. 13, 1943 |
| 2,446,730 | Wemp | Aug. 10, 1948 |
| 2,466,812 | Jacobsen | Apr. 12, 1949 |